(12) United States Patent
Day

(10) Patent No.: US 8,613,997 B2
(45) Date of Patent: Dec. 24, 2013

(54) LAMINATED GLAZING PANEL

(75) Inventor: Stephen Roland Day, Wigan (GB)

(73) Assignee: Pilkington PLC, St. Helens, Merseyside (GB)

( * ) Notice: Subject to any disclaimer, the term of this patent is extended or adjusted under 35 U.S.C. 154(b) by 1366 days.

(21) Appl. No.: 10/520,788

(22) PCT Filed: Jul. 17, 2003

(86) PCT No.: PCT/GB03/03095
§ 371 (c)(1), (2), (4) Date: Jan. 11, 2005

(87) PCT Pub. No.: WO2004/009349
PCT Pub. Date: Jan. 29, 2004

(65) Prior Publication Data
US 2005/0238857 A1    Oct. 27, 2005

(30) Foreign Application Priority Data
Jul. 19, 2002   (GB) .................................. 0216787.2

(51) Int. Cl.
*B23B 3/00*    (2006.01)
(52) U.S. Cl.
USPC ............ 428/209; 428/426; 428/458; 219/522
(58) Field of Classification Search
USPC .................. 219/522; 428/209, 426, 458, 901; 156/182, 99
See application file for complete search history.

(56) References Cited

U.S. PATENT DOCUMENTS

| 3,317,906 A | 5/1967 | Baldridge |
| 4,636,698 A | 1/1987 | Leclercq |
| 4,761,720 A * | 8/1988 | Solow ........................... 362/252 |

(Continued)

FOREIGN PATENT DOCUMENTS

| DE | 4208922 C1 | 5/1993 |
| DE | 44 31 890 A1 | 3/1995 |

(Continued)

OTHER PUBLICATIONS

"Leuchtende Bilder in Glasscheiben" HTTP:, "Online!, Oct. 25, 2002, XP002241074, Retrieved from the Internet: URL:www.schott.com/architecture/english/n_ews/press.html" retrieved on May 13, 2003! the whole document.

(Continued)

*Primary Examiner* — Brian Jennison
(74) *Attorney, Agent, or Firm* — Buchanan Ingersoll & Rooney PC

(57) ABSTRACT

A laminated glazing panel includes two glass plies and a plastic ply having one or more light emitting diodes mounted on a circuit board laminated between the glass plies, forming an LED device. The circuit board is ordinarily a flexible circuit board that includes a substrate and a conductive layer. A plurality of light emitting diodes may be mounted on the flexible circuit board and laminated between the glass plies The resultant glazing panel may further include indicia on at least one ply. Processes for the production of a laminated glazing panel involve positioning an LED device in a cut-out in a plastic ply and interleaving the plastic ply between two glass plies, prior to laminating the plies. One or more plastic plies may be used, and the LED device may be coated in a plastic material.

17 Claims, 2 Drawing Sheets

(56) References Cited

U.S. PATENT DOCUMENTS

Figure 1:
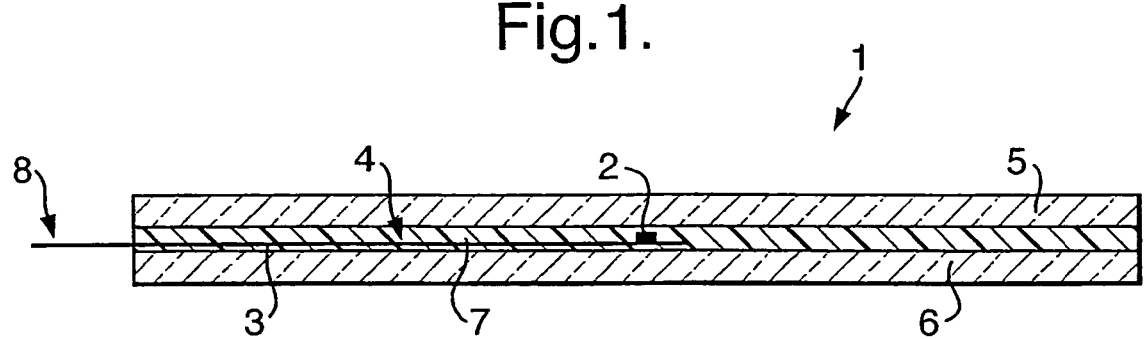

| | | | |
|---|---|---|---|
| 4,968,895 A | | 11/1990 | Leclercq |
| 5,193,895 A | * | 3/1993 | Naruke et al. ............... 362/542 |
| 5,469,020 A | | 11/1995 | Herrick |
| 5,650,208 A | | 7/1997 | Chaussade et al. |
| 5,771,617 A | | 6/1998 | Baker |
| 5,890,794 A | | 4/1999 | Abtahi et al. |
| 5,927,845 A | * | 7/1999 | Gustafson et al. ............ 362/152 |
| 6,197,418 B1 | | 3/2001 | Cloots et al. |
| 6,208,031 B1 | * | 3/2001 | Fraivillig ..................... 257/758 |
| 6,270,236 B1 | | 8/2001 | Brussog |
| 6,281,525 B1 | | 8/2001 | Krijn et al. |
| 6,361,867 B2 | * | 3/2002 | Kishida et al. ............... 428/428 |
| 2001/0055458 A1 | * | 12/2001 | Ladd ............................ 385/129 |

FOREIGN PATENT DOCUMENTS

| | | |
|---|---|---|
| DE | 297 16 214 | 11/1997 |
| DE | 20204263 U1 | 7/2003 |
| EP | 0267331 A1 | 5/1988 |
| EP | 0 560 585 | 9/1993 |
| EP | 0 608 180 | 7/1994 |
| EP | 1 076 205 A1 | 2/2001 |
| EP | 1229205 A1 | 8/2002 |
| EP | 1267029 A1 | 12/2002 |
| EP | 1346822 A1 | 9/2003 |
| GB | 1 401 497 | 7/1975 |
| GB | 1490978 A | 11/1977 |
| GB | 2 126 328 | 3/1984 |
| GB | 2383192 A | 6/2003 |
| JP | 02084684 | 3/1990 |
| WO | 90/13885 A1 | 11/1990 |
| WO | 01/33487 A2 | 5/2001 |
| WO | 01/82378 A1 | 11/2001 |

OTHER PUBLICATIONS

UK Patent Office Search Report dated Nov. 26, 2002.
Opposition filed Dec. 30, 2011 in the European Patent Office by Webasto AG against European Patent No. 1534513 and English language translation (67 pgs).
Opposition filed Dec. 20, 2011 in the European Patent Office by Schott AG against European Patent No. 1534513 (8 pgs).
Observations filed by Pilkington Group Limited on Aug. 23, 2012 in Oppositions by Schott AG and Webasto AG in European Patent No. 1534513 (23 pgs).
"Leiterplatte", Wikipedia, Dec. 19, 2011, 9 pgs, http://de.wikipedia.org/wiki/Leiterplatte.
Sautter et al., "Leiterplattentechnik", Lexikon Elektronik and Mikroelektronik, 1990 (month unknown), pp. 454-457, VDI Verlag, Germany.
Extract from Kunststoff Taschenbuch, pp. 525, 526 and 591, 1974 (month unknown), 19th Edition, Carl Hanser Verlag, Munich, Germany.

* cited by examiner

LAMINATED GLAZING PANEL

The present invention relates to laminated glazing panels. More particularly, the present invention relates to laminated glazing panels comprising two glass plies, a plastic ply, and one or more light emitting diodes laminated between the glass plies.

Laminated glazing panels usually comprise two glass sheets and a plastic sheet (often of polyvinylbutyral) interleaved between the glass sheets, i.e. the plastic sheet extends between the glass sheets and is substantially co-extensive with them. The plastic sheet is often referred to as an interlayer. For the avoidance of doubt, the term "plastic" as used herein refers to the material from which the interlayer is made, rather than to a mechanical property of the interlayer. Laminated glazing panels find uses in windows, (especially vehicle windows) in doors and in screens.

Laminated glazing panels are normally produced by a lamination process comprising subjecting the composite glass ply/interlayer/glass ply structure to relatively high temperature (typically exceeding 100° C.) and pressure (typically exceeding 5 atmospheres) in an autoclave. During the lamination process, the interlayer tends to creep or flow which ensures good contact with the glass plies and consequently good optical properties. Laminated glazing panels may also be produced by a cast-in-situ process in which a fluid interlayer material is introduced between glass plies and cured in situ (e.g. by heat or ultraviolet radiation) to produce a plastic interlayer. Cast-in-situ processes are not preferred for the production of laminated glazing panels because the mechanical and fracture properties of the laminate tend not to be suitable to be used in windows, doors or screens.

It is often advantageous to provide laminated glazing panels with devices which improve the utility of the panel, for example, indicators, lights or sensors. U.S. Pat. No. 3,317,906 discloses an improved safety laminate having instrument indicators means incorporated therein. The indicator means disclosed include a mechanical device comprising an electromagnetically operated needle and a calibrated scale, which device is located between a pair of panels, in a circular space provided within the plastic interlayer.

Devices more sensitive than the type of robust mechanical device previously described have also been provided in laminated glazing panels, again to improve the utility of said panels.

U.S. Pat. No. 4,968,895 discloses a laminated glass which incorporates such a sensitive device in the form of a photodiode of a thickness such that it fits into a purposefully created notch in the plastic interlayer of the laminate. It teaches that the photodiode ought to be located in the interlayer in the vicinity of one of the edges of the glass to allow the conductors of the diode to extend beyond the edge of the glass for connection to a circuit.

It would be desirable to provide a laminated glazing having improved utility by provision of one of more light emitting diodes ("LEDs") within said laminate, and further desirable to provide a simple and efficient process for incorporating the one or more LEDs into a laminated glazing.

Surprisingly, the inventors have discovered that one or more LEDs mounted on a circuit board laminated between two glass plies can survive the lamination process.

The present invention accordingly provides a laminated glazing panel comprising two glass plies, a plastic ply and one or more light emitting diodes which are laminated between the glass plies, wherein the one or more light emitting diodes are mounted on a circuit board.

The one or more light emitting diodes mounted on the circuit board preferably form a light emitting diode device. It is surprising that such light emitting diode devices ("LED devices") survive the lamination process because both LEDs and the often intricate, fine pathways of circuits are frequently prone to failure mechanisms which occur at high temperatures and pressures. For example, boiling of stray moisture, or expansion of air or gas pockets, and mismatch between thermal expansion coefficients, can detach electrical connections or otherwise damage an LED device.

It is advantageous to laminate LED devices for a number of reasons. LEDs may be used as indicating devices and may produce relatively intense light at a variety of wavelengths. Intensity of light can be important, for example, when the panel is used as a window and the indicating device needs to be visible against external illumination. Moreover, LEDs have long lifetimes which are comparable to the expected lifetimes of a laminated glazing panel. Furthermore, laminating LED devices, especially those having multiple LEDs mounted on the circuit board, removes the requirement for multiple electrical connections to each LED that would otherwise prevail; rather a single electrical connection to the circuit board itself, via a suitable connection means, is all that is required to power the LEDs.

Preferably, the circuit board on which the one or more lights emitting diodes are mounted includes a flexible circuit board comprising a substrate and a conductive layer.

The one or more LEDs may be mounted and electrically connected on a flexible circuit board without modification to them. Surprisingly, these LED devices (which often have delicate electrical connections) can also survive the lamination process, despite problems associated with, for example boiling of plasticiser, which had been thought likely to cause rupturing of the one or more mountings in an LED device or failure of the one or more LEDs themselves (depending upon the specific conditions for lamination).

The material of the flexible circuit board should adhere well to the laminate interlayer to prevent a reduction in the overall integrity of the laminated glazing panel. Materials less susceptible or impervious to moisture are thus preferred because any circuit board material has the potential to transport moisture into the laminate, which then alters the strength, the bonding capability and the ability to dissolve gases of the interlayer material.

The substrate comprised in the flexible circuit board is preferably a polymeric material. Two materials in particular are often used for this purpose, namely polyimide and polyester. Polyimide is usually yellow to brown in colour and is beneficial to use because it is able to withstand the soldering process by which the one or more LEDs may be connected to the conductive layer. Polyester may be transparent or translucent, which is advantageous as the circuit board may then have high light transmission and low visibility. However, because polyester has a tendency to degrade when solder is used to attach the one or more LEDs to the conductive layer, use of conductive adhesives is preferred.

Preferably the conductive layer is a metal foil which is adhered to the substrate. The metal foil is normally a copper metal foil which is bonded to the substrate, and subsequently etched to produce the circuit pathways required. Types of polyester film, acrylic film and epoxy resins may be used to adhere the metal foil to the substrate; adhesion often necessitates use of sufficient heat and pressure (each of which are determined on a case by case basis). Once etched, the metal foil pathways on the substrate may further be covered and insulated by a layer of a material such as a polyester, an acrylic or a epoxy resin.

A conductive ink which is in direct contact with the substrate is another type of material that may be used to form the conductive layer. A conductive ink may be deposited onto the substrate, for example, in a screen-printing process. Conductive inks can be difficult to solder to, so are often used with polyester substrates (with which use of conductive adhesives is already preferred, as discussed earlier, for attachment of the one or more LEDs thereto).

Advantageously, the flexible circuit board further comprises a rigid layer, which may provide the circuit board with extra rigidity by increasing the thickness of said circuit board. Any one of a number of stiff materials may be used, including sheets of metal, sheets of paper-phenolic board and sheets of glass or epoxy resin board.

Preferably, the flexible circuit board extends outwardly beyond an edge of the laminated glazing panel to enable connection of the circuit board to a power supply. However, the circuit board may alternatively terminate within the laminated glazing panel where it may be connected to, or in electrical contact with, an electrical current carrier that is integral with the glazing, for example a busbar or a thin surface coating of metal or of a conductive metal oxide, which in turn is connected to, or in electrical contact with, a power supply.

Depending upon the intended use of the laminated glazing panel, a plurality of light emitting diodes may be mounted on the circuit board. A plurality of LEDs (for example arranged in an array) allow text or other relatively complex information to be indicated on the panel. Alternatively, LEDs may be arranged around part or the whole of the periphery of the laminated glazing panel to provide an illuminated outline of the panel for safety or aesthetic reasons. To improve the utility of such a panel further, the panel may further comprise indicia on at least one ply to convey information relating to the LEDs, or which alter the visual appearance of the device when in the finished laminated glazing panel.

The plastic interlayer ply may comprise a cut-out therein to aid successful lamination of the one or more light emitting diodes mounted on the circuit board in the glazing panel. Preferably, multiple plastic plies are used to laminate the one or more light emitting diodes mounted on the circuit board in the glazing panel. Where three plies are used for lamination, it is the middle ply that may be provided with the cut-out.

The one or more light emitting diodes and the circuit board together may be at least partially coated in a material compatible with the material of the plastic ply. In the case where a single plastic ply is used for lamination, and a cut-out is provided, the coating on the LED device may be beneficial for both adhering the device to the surrounding plastic ply and ensuring the low visibility of the join between the two, and for directly adhering the LED device to the adjacent glass plies. In the case where three plastic plies are used for lamination, and a cut-out is provided in the middle ply, the coating on the LED device may be beneficial for adhering the device to the surrounding plastic ply and ensuring the low visibility of the join between the two, for directly adhering the LED device to the adjacent plastic plies, and for compensating for any lack of comparable thickness between the LED device itself and the middle plastic ply. Thus the LED device is most preferably coated in the same material as that of the plastic ply.

Usually, the plastic ply will comprise a polyvinylacetal, preferably polyvinylbutyral. Preferably, the plastic ply has a thickness before lamination of 2 mm or lower, and more preferably the plastic ply has a thickness before lamination of 1 mm or lower, most preferably of about 0.8 mm. The LED device will generally have a thickness less than the thickness of the plastic ply so that it is substantially enclosed after lamination. This is advantageous because such thin plastics plies enable thin laminates to be constructed; the preferred thickness of the laminated glazing panel being 8 mm or lower.

In another aspect, the present invention provides a process for the production of a laminated glazing panel comprising interleaving a plastic ply between two glass plies and laminating the plies, wherein, prior to lamination, a cut-out area is prepared in the plastic ply to receive a circuit board on which one or more light emitting diodes are mounted, said circuit board and one or more light emitting diodes together being at least partially coated with a material compatible with the material of the plastic ply, and the circuit board is positioned in the cut-out area in the plastic ply.

In a further aspect, the present invention also provides a process for the production of a laminated glazing panel comprising pairing together two plastic plies, preparing a cut-out area in the upper plastic ply to receive a circuit board on which one or more light emitting diodes are mounted, positioning said circuit board in the cut-out area, joining a further plastic ply to the paired plastic plies, thereby creating a composite ply, interleaving the composite ply between two glass plies and laminating the plies.

The cut-out area is of approximately the same dimensions as the LED device; the tolerance on accuracy in sizing being around 0.5 mm in any direction.

The circuit board and the one or more light emitting diodes described in the further aspect of the invention are together preferably at least partially coated with a material compatible with the material of the plastic ply, and are further preferably coated with the same material as that of the plastic ply.

Conveniently, the overall thickness of the coated circuit board on which one or more light emitting diodes are mounted is comparable with the thickness of the plastic ply in which it is positioned. Many LEDs are around 500 µm in thickness, whilst an average flexible circuit board may be 200 µm in thickness, thus an LED device may be up to 0.7 mm in thickness at its thickest part. The plastic ply is often polyvinylbutyral ("PVB") which is commonly available in 0.76 mm thickness, although plies of 0.25 mm and 0.38 mm are desirable.

Laminated glazing panels according to the present invention have many uses including in a window (especially a vehicle window), door or screen. The LEDs enable laminated glazing panels to be provided with various functions. Examples of such functions include: illumination, LEDs as indicia to convey information or to provide an aesthetic function by defining images (including moving images), and sensors including moisture sensors (for example, optical moisture sensors) and proximity sensors.

Figure 2:
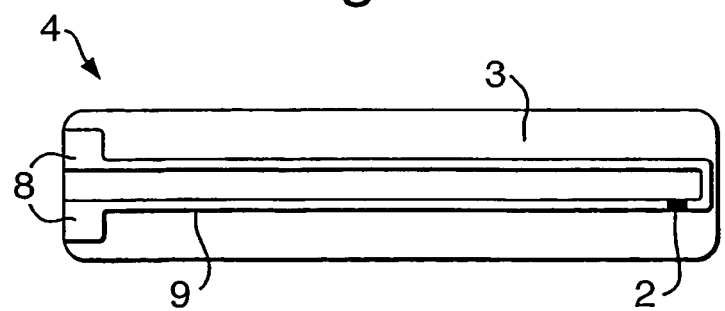
Figure 3A:
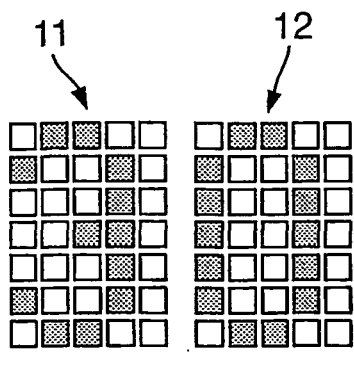
Figure 3B:
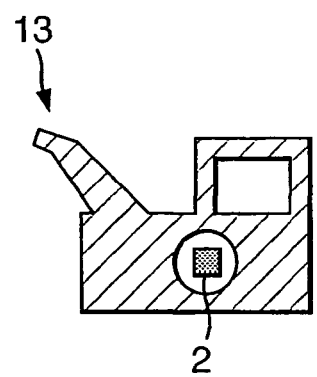
Figure 3C:
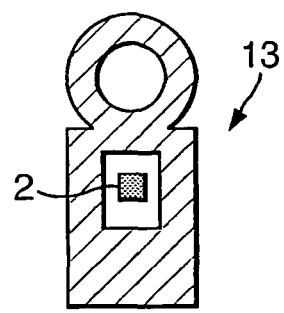
Figure 3D:
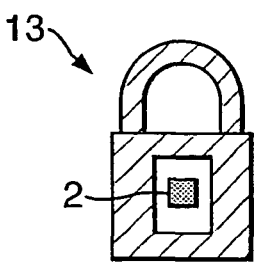
Figure 3E:
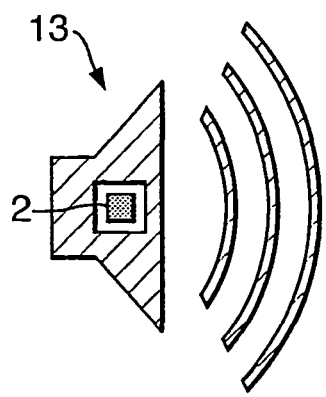

The invention is illustrated but not limited by the following drawings in which:

FIG. 1 illustrates in section an LED device laminated in a laminated glazing panel, FIG. 2 illustrates in plan view an LED mounted on a flexible circuit board, and FIG. 3 illustrates arrangements of LEDs for use as indicia as they would appear once mounted on a circuit board and laminated in a laminated glazing panel.

FIG. 1 shows a laminated glazing panel 1 in which an LED device 4, which comprises a light emitting diode 2 mounted on a flexible circuit board 3, is laminated between an upper glass ply 5 and a lower glass ply 6. The LED device 4 is positioned in a polyvinylbutyral ply 7. Electrical connection to the LED device can be made by connecting an electrical connector (not shown) to the flexible circuit board 3 in the area outboard of the glazing panel 1 at the connection areas 8.

FIG. 2 shows an LED device 4 in more detail prior to lamination. A light emitting diode 2 is mounted on a conductive pathway 9 on a flexible circuit board 3 (supplied by Nitto UK Ltd). The flexible circuit board 3 may be connected to a power supply (not shown) at the connection areas 8.

FIG. 3 shows examples of indicia which may be provided on a vehicle (e.g. a car) windscreen. Each of the exemplified indicia incorporates one or more light emitting diodes laminated in the windscreen in accordance with the invention. FIG. 3(a) illustrates two 5 by 7 arrays 11, 12 of light emitting diodes. Using appropriate electronic addressing and measurement of vehicle speed, the arrays indicate the speed of a vehicle, in this case indicated by the number 30. FIG. 3(b) illustrates a printed indicium 13 representing oil. When lit, the light emitting diode 2 provides a low oil warning. FIG. 3(c) illustrates a printed indicium representing fuel. When lit, the light emitting diode 2 provides a low fuel warning. FIG. 3(d) illustrates a printed indicium representing a lock. When lit, the light emitting diode 2 provides an indication that the vehicle is locked. FIG. 3(e) illustrates a printed indicium representing a vehicle alarm. When lit, the light emitting diode 2 provides an indication that the vehicle alarm is on.

In the case of alarm or warning indicia it may be desirable to flash the light emitting diode to draw the users' attention. The printed (i.e. graphical) part of the indicia may be printed on to any of the glass surfaces of the laminate or on the surface of the circuit board.

The flexible circuit boards can be made in a variety of forms with multiple conductive track layers and insulator substrate layers. The light emitting diodes are preferably thinner than the plastics ply, thus are preferably thinner than 1 mm or so. Suitable light emitting diodes can be obtained as articles of commerce, for example in red, green, yellow, orange, orange-red, yellow-orange and deep red colours (from e.g. Idea, Inc. of Brea, Calif., USA).

A laminated glazing panel according to the invention may be manufactured as follows. A ply of PVB 7 is laid on a glass ply 5. A partial or whole cut-out is made in the PVB ply 7 corresponding to the shape of a flexible circuit board 3. A flexible circuit board 3, having one or more light emitting diodes 2 mounted on it, coated with a PVB material is positioned in the cut-out in the PVB ply 7. A second glass ply 6 is laid on top of the PVB ply 7. The laminate is de-gassed and autoclaved under the usual conditions well known in the art, typically at a temperature of about 100° C. to 150° C. and pressure of about 5 to 15 atmospheres.

An alternative method of manufacture involves pairing two plies of PVB 7 by rolling them together. The plies are substantially co-extensive. The two plies are laid on a glass ply 5. A partial or whole cut-out is made in the upper PVB ply 7 corresponding to the shape of a flexible circuit board 3. A flexible circuit board 3, having one or more light emitting diodes 2 mounted on it, is positioned in the cut-out in the upper PVB ply 7. A further PVB ply 7 is laid on top of the two PVB plies 7. A second glass ply 6 is laid on top of the PVB plies 7. The laminate is de-gassed and autoclaved under the usual conditions well known in the art, typically at a temperature of about 100° C. to 150° C. and pressure of about 5 to 15 atmospheres.

The invention claimed is:

1. A process for the production of a laminated glazing panel comprising pairing together two plastic plies, preparing a cut-out area in the upper plastic ply to receive a circuit board on which one or more light emitting diodes are mounted, positioning said circuit board in the cut-out area, joining a further plastic ply to the paired plastic plies, thereby creating a composite ply, interleaving the composite ply between two glass plies, and laminating the two glass plies and the composite ply, including the circuit board on which is mounted the one or more light emitting diodes, at a temperature of about 100° C. to 150° C.

2. A process for the production of a laminated glazing panel according to claim 1 wherein the circuit board and one or more light emitting diodes together are at least partially coated with a material compatible with the material of the plastic ply.

3. A process for the production of a laminated glazing panel according to claim 1 wherein the two plastic plies that are paired together are made of polyvinylbutyral (PVB).

4. A process for the production of a laminated glazing panel according to claim 1 wherein the two glass plies and the composite ply including the circuit board on which the one or more light emitting diodes are mounted are laminated at a pressure of about 5 to 15 atmospheres.

5. A process for the production of a laminated glazing panel according to claim 1 wherein the laminated glazing panel possesses a thickness equal to or less than 8 mm.

6. A laminated glazing panel comprising two glass plies, a plastic ply and a light emitting diode device laminated between the glass plies, the light emitting diode device which is laminated between the glass plies comprising one or more light emitting diodes mounted on a circuit board, wherein the glass plies and the plastic ply with the one or more light emitting diodes are laminated at a temperature of about 100° C. to 150° C., wherein the laminated glazing panel possesses a thickness of 8 mm or less, and the light emitting diode device possesses a thickness less than 0.8 mm;
wherein the thickness of the light emitting diode device is less than the thickness of the plastic ply.

7. A laminated glazing panel as claimed in claim 6 wherein the circuit board comprises a substrate and a conductive layer.

8. A laminated glazing panel as claimed in claim 6 wherein the circuit board is a flexible circuit board comprising a substrate and a conductive layer.

9. A laminated glazing panel as claimed in claim 8 wherein the substrate comprises polyimide.

10. A laminated glazing panel as claimed in claim 8 wherein the substrate comprises polyester.

11. A laminated glazing panel as claimed in claim 8 wherein the conductive layer is a metal foil which is adhered to the substrate.

12. A laminated glazing panel as claimed in claim 8 wherein the conductive layer is conductive ink which is in direct contact with the substrate.

13. A laminated glazing panel comprising two glass plies, a plastic ply and a light emitting diode device laminated between the glass plies, the light emitting diode device which is laminated between the glass plies comprising one or more light emitting diodes mounted on a circuit board, wherein the glass plies and the plastic ply with the one or more light emitting diodes are laminated at a temperature of about 100° C. to 150° C., wherein the light emitting diode device possesses a thickness less than 0.8 mm, wherein the thickness of the light emitting diode device is less than the thickness of the plastic ply.

14. A laminated glazing panel as claimed in claim 13 wherein the circuit board comprises a substrate and a conductive layer.

15. A laminated glazing panel comprising two glass plies, a plastic ply and a light emitting diode device laminated between the glass plies, the light emitting diode device which is laminated between the glass plies comprising one or more light emitting diodes mounted on a substrate, wherein the glass plies and the plastic ply with the one or more light emitting diodes are laminated at a temperature of about 100° C. to 150° C., wherein the light emitting diode device possesses a thickness less than 0.8 mm, wherein the thickness of the light emitting diode device is less than the thickness of the plastic ply.

16. A laminated glazing panel as claimed in claim 15 further comprising a conductive layer on the substrate.

17. A laminated glazing panel as claimed in claim 15 further comprising a conductive layer adhered to the substrate.

* * * * *